United States Patent [19]
Külterer et al.

[11] 3,748,037
[45] July 24, 1973

[54] ARRANGEMENT FOR ILLUMINATING ORIGINALS IN MICROFILMING APPARATUS

[75] Inventors: Reinhard Külterer; Adolf Moll; Wilfried Hofmann, all of Munich, Germany

[73] Assignee: AGFA-Gevaert Aktiengesellschaft, Leverkusen, Germany

[22] Filed: Apr. 24, 1972

[21] Appl. No.: 247,143

[30] Foreign Application Priority Data
Apr. 27, 1971 Germany................. P 21 20 727.2

[52] U.S. Cl. .................................. 355/71, 353/97
[51] Int. Cl. ...................... G03b 27/54, G02b 9/00
[58] Field of Search ............... 355/71, 34, 50, 108; 350/266; 353/97

[56] References Cited
UNITED STATES PATENTS
| | | | |
|---|---|---|---|
| 3,264,933 | 8/1966 | Frank | 355/50 |
| 1,086,966 | 2/1914 | Wiegand | 355/108 |
| 3,312,143 | 4/1967 | Karow | 355/71 X |
| 3,504,960 | 4/1970 | Harper | 350/266 X |
| 2,381,980 | 8/1945 | Offner | 355/31 |

*Primary Examiner*—Samuel S. Matthews
*Assistant Examiner*—Michael D. Harris
*Attorney*—Michael S. Striker

[57] ABSTRACT

A microfilming apparatus wherein a single incandescent lamp illuminates successive increments of a continuously moving strip-shaped original in an image plane. The reflected light beam passes through a slit of a diaphragm and is focussed by a lens onto successive frames of a microfilm which moves continuously in the focal plane of the lens. The lamp is adjustable toward and away as well as transversely of the original in the image plane, and the width of the slit increases from its center toward both ends to compensate for the decreasing effective aperture of the lens in a direction from the optical axis toward its periphery as well as for decreasing intensity of light from the center toward the edges of the original. The lens is shielded from the lamp and is located between the two planes intermediate the microfilm and the lamp.

7 Claims, 2 Drawing Figures

ARRANGEMENT FOR ILLUMINATING ORIGINALS IN MICROFILMING APPARATUS

BACKGROUND OF THE INVENTION

The present invention relates to apparatus for copying information which is stored on elongated strip-shaped originals, such as strips of exposed and developed photographic film. More particularly, the invention relates to improvements in illuminating arrangements for use in microfilming apparatus. Still more particularly, the invention relates to improvements in illuminating arrangements for successive increments of continuously moving originals in microfilming apparatus wherein the original moves lengthwise in a first direction and successive increments of such original are imaged by an optical system onto successive frames of a continuously moving microfilm which is transported in a second direction counter to the direction of movement of the original.

In certain presently known microfilming apparatus, the image plane is illuminated by a row of discrete light sources, such as incandescent lamps. The row of lamps extends transversely of the direction of movement of the original, and the distance between adjoining lamps of such a row is selected with a view to compensate for decreasing effective aperture of the lens in directions from the center toward the marginal portions of the original in the image palne. As a rule, the distance between the lamps in the median portion of the row is greater than the distance between the lamps which are adjacent to the ends of the row. In order to avoid streaking of the microfilm, it is necessary to properly select and orient the lamps not only in dependency on the positions of their filaments with respect to the sockets but also as concerns the intensity of light which is furnished by discrete lamps. As a rule, the entire row of lamps has to be replaced with a fresh row in the event of failure of a single lamp.

It was also proposed to mount at least some of the lamps which form the aforementioned row in such a way that the selected lamps are adjustable relative to the remaining lamps of the row. This was intended to compensate for differences in the intensity of lamps. All such arrangements are extremely bulky and expensive and, furthermore, the adjustments must be carried out by highly skilled persons.

It was also proposed to utilize in a photocopying apparatus a rod-shaped source of light, for example, a gas discharge tube which is mounted behind a slit provided in a stationary diaphragm. The width of the slit varies so as to compensate for decreasing brightness of light from the center toward the marginal portion of the path for the original as well as for the decreasing effective aperture of the optical system. A drawback of such rod-shaped light sources is that the intensity of light varies during their useful life. Such variations of intensity result in inaccurate compensation by the slit-shaped diaphragm. Still further, even if the gas discharge tube is connected to a source of direct current, pronounced flickering of light which issues from such light source cannot be avoided and this invariably leads to improper illumination of successive increments of the original which are transported through the image plane. Therefore, such proposal has found no acceptance in the microfilming industry.

SUMMARY OF THE INVENTION

An object of the invention is to provide a microfilming apparatus with a novel and improved light source which can be constructed and mounted in such a way that it insures uniform or at least substantially uniform illumination of that increment of a continuously moving original which is located in the image plane.

Another object of the invention is to provide microfilming and analogous apparatus with a novel and improved illuminating arrangement which is simpler, more reliable and longer-lasting than the illuminating arrangements of heretofore known apparatus.

Still another object of the invention is to provide an illuminating arrangement which can utilize commercially available light sources.

Another object of the invention is to provide a microfilming apparatus with a diaphragm which can properly compensate for variations in effective aperture of the optical system and also for variations in intensity of light which impinges upon different portions of those increments of a continuously moving original which are located in the image plane.

The invention is embodied in photographic copying apparatus, particularly in a microfilming apparatus, which comprises feeding means for advancing a strip-shaped original which is to be copied in a predetermined direction along a predetermined path so that successive increments of the original enter and move in and beyond a predetermined image plane, a source of light which preferably comprises a single commercially available incandescent lamp arranged to illuminate successive increments of the original in the image plane, a diaphragm which extends across the beam of light reflected by successive increments of the original in the image plane and has a light-transmitting slit extending transversely of the path of movement of the original, and an optical system which may comprise a single lens of circular outline and is located in the path of the reflected light beam to image successive increments of the original into a second plane. The effective aperture of the optical system varies transversely of the path of movement of the original and the width of the slit also varies transversely of the path of the original as a function of variations of such effective aperture.

In accordance with another feature of the invention, the light source is located substantially centrally of the path of movement of the original so that the intensity of light which issues from such source varies in a direction transversely of the path of movement of the original. The width of the slit varies not only as a function of changes in the effective aperture of the optical system but also as a function of variations in the intensity of light which issues from the source.

The optical system is preferably shielded from light which issues from the light source, and the apparatus is preferably provided with adjusting means which is actuatable to move the light source transversely of the path of movement of the original and/or toward and away from such path.

The novel features which are considered as characteristic of the invention are set forth in particular in the appended claims. The improved copying apparatus itself, however, both as to its construction and its mode of operation, together with additional features and advantages thereof, will be best understood upon perusal of the following detailed description of certain specific

DESCRIPTION OF THE PREFERRED EMBODIMENTS

Figure 1:
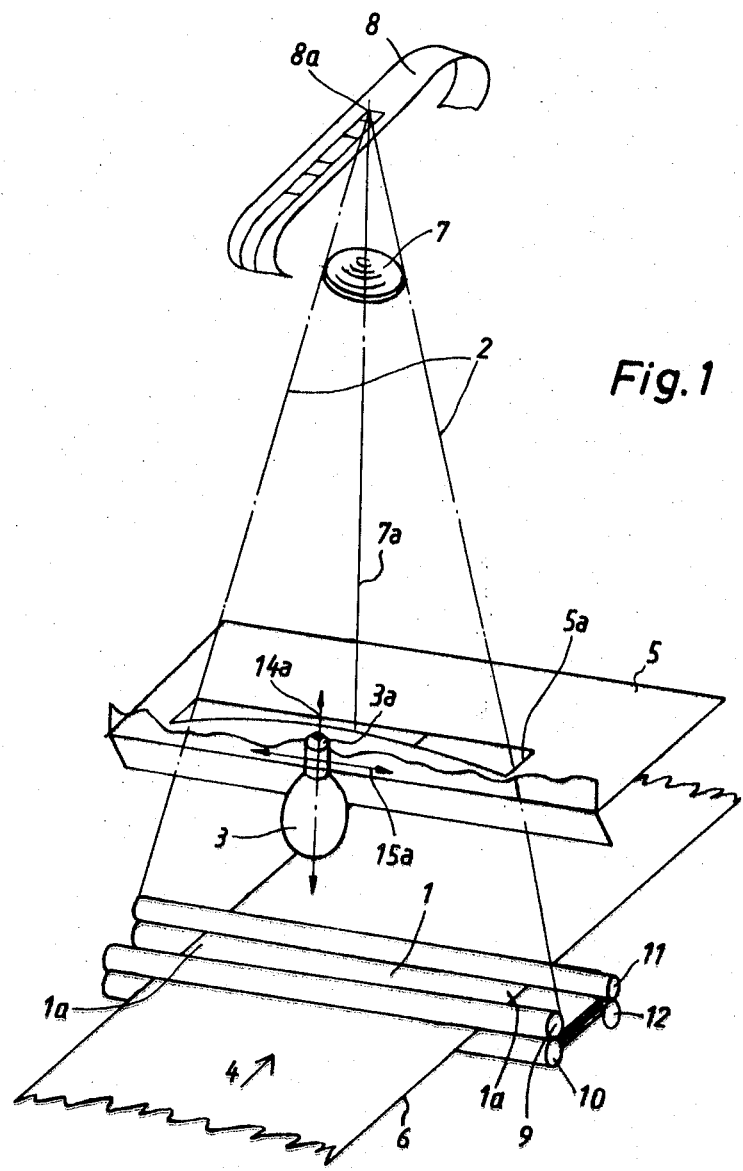
FIG. 1 is a diagrammatic perspective view of a portion of a copying apparatus which embodies the invention.
Figure 2:
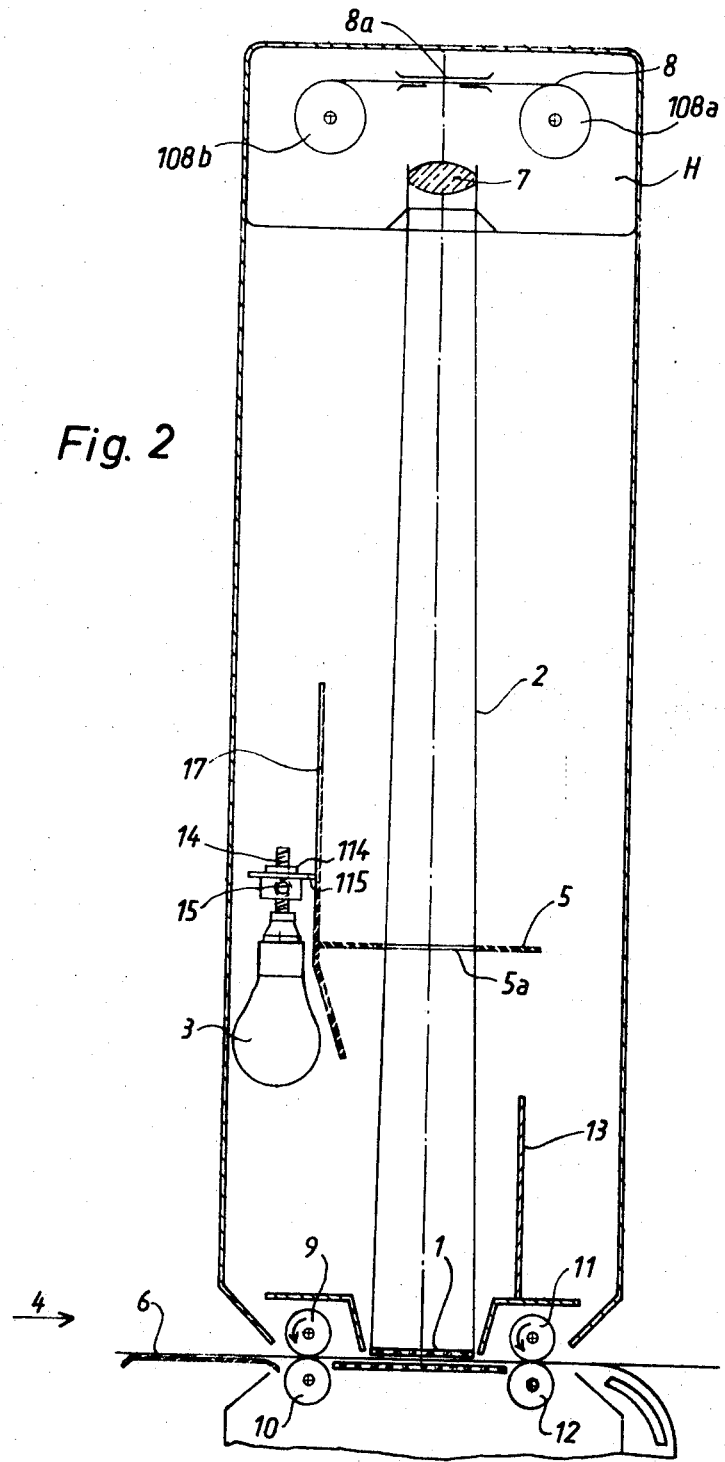
FIG. 2 is a longitudinal vertical sectional view of the apparatus.

The drawing illustrates a microfilming apparatus which operates on the continuous-flow principle. The apparatus comprises a housing H which accmmodates in its lower portion a feeding or advancing unit for a strip-shaped original 6 which is transported in the direction indicated by the arrow 4. The feeding unit comprises two pairs of driven advancing or feeding rolls 9, 10 and 11, 12 which are respectively located ahead of and behind a horizontal image plane 1, as considered in the direction indicated by the arrow 4. A light source, here shown as consisting of a single commercially available incandescent lamp 3, is located at a level above the image plane 1 and serves to emit light which is reflected by successive increments of the original 6 in the image plane 1 whereby the beam 2 of reflected light passes through a specially configurated elongated slit 5a which is provided in a stationary horizontal plate-like diaphragm 5 mounted in the interior of the housing H at a level above the image plane 1. An optical system, here shown as comprising a single lens 7 of circular outline, images successive increments of the original 6 onto successive frames 8a of a web of photosensitive material here shown as a microfilm 8. The means for transporting the microfilm 8 in the focal plane of the optical system 7 includes a supply reel 108a and a takeup reel 108b both mounted in the upper portion of the housing H at a level above the optical system.

As shown in FIG. 1, the lamp 3 is mounted substantially midway between the marginal portions of the original 6 which is being transported by the rolls 9 to 12. The apparatus further comprises means for adjusting the position of the lamp 3 with respect to the image plane 1. Such adjusting means includes a first device which can move the lamp 3 up and down, namely, toward and away from the image plane 1 as indicated by the double-headed arrow 14a. The adjusting means further comprises a second device which serves to move the lamp 3 transversely of the direction of movement of the original 6, as indicated by the double-headed arrow 15a. The first adjusting device includes a feed screw 14 which is mounted on a bracket 114 in the interior of the housing H and can be rotated by hand or by remote control to move the lamp 3 up and down. The second adjusting device comprises a feed screw 15 which can move the bracket 114 transversely of the direction indicated by the arrow 4 and can be rotated by hand or by remote control. The bracket 115 for the feed screw 15 is mounted on a shield 17 which is mounted in the interior of the housing H and serves to shield the optical system 7 from light which issues from the lamp 3. The shield 17 can further support the diaphragm 5. A preferably white reflector 13 is mounted in the housing H behind the image plane 1 to reflect some light issuing from the lamp 3 onto successive increments of the original 6 in the image plane.

The substantially central mounting of the lamp 3 between the marginal portions of the original 6 insures symmetrical illumination of the two halves of successive increments of the original in the image plane 1 whereby the intensity of light decreases in a direction from the center toward both marginal portions 1a of the image plane 1. The effective aperture of the optical system 7 also decreases from its center toward the periphery so that, in the absence of a remedial action, the brightness of the images on successive frames 8a of microfilm 8 would decrease from the center toward the marginal portions of the microfilm. In accordance with a feature of the invention, the quality of the exposures on microfilm 8 is improved substantially by configurating the slit 5a of the diaphragm 5 in such a way that its width varies not only as a function of variations of the intensity of light issuing from the lamp 3 and impinging upon the different portions of the increments of original 6 in the image plane 1 but also as a function of variations in resolving effective aperture of the optical system 7. resolving shown in FIG. 1, the width of the slit 5a decreases from both ends toward the center thereof and the decrease in width is propotional to the increase in effective aperture of the optical system 7 toward the optical axis 7a as well as to increasing intensity of light in a direction from the marginal portions 1a toward the center of the image plane 1, namely, that plane which is located between the two pairs of advancing rolls 9, 10 and 11, 12. It was found that the just outlined configuration of the slit 5a insures uniform exposure of frames 8a on the microfilm 8.

The quality of frames 8a depends also on the constancy of transport of the original 6 in the direction indicated by the arrow 4 and on the fluctuations in intensity of light which issues from the lamp 3. It was found that such fluctuations do not overly affect the quality of exposures on the microfilm 8 even if the lamp 3 is connected to a source of alternating current.

The adjusting device 14 serves to vary the overall intensity of light which reaches the image plane 1. The adjusting device 15 comensates for eventual non-uniformity of illumination of the left-hand and right-hand portions of the image plane 1, as viewed in FIG. 1. Such non-uniformity of light intensity may be due to improper positioning of the filament in the envelope of the lamp 3 with respect to its socket 3a. The two adjusting devices 14 and 15 enable an operator to properly select the position of the lamp 3 so as to insure a desired intensity of illumination of the image plane 1 as well as a desirable uniformity of illumination of the two halves of the image plane at the opposite sides of a vertical symmetry plane that extends and right angles to and is normal to the plane 1.

Without further analysis, the foregoing will so fully reveal the gist of the present invention that others can, by applying current knowledge, readily adapt it for various applications without omitting features which fairly constitute essential characteristics of the generic and specific aspects of our contribution to the art, and therefore, such adaptations should and are intended to be comprehended within the meaning and range of equivalence of the claims.

What is claimed as new and desired to be protected by Letters Patent is set forth in the appended

1. In a microfilming apparatus, a combination comprising means for advancing a strip-shaped original which is to be copied in a predetermined direction along a predetermined path so that successive increments of the original enter and move in and beyond a predetermined image plane; a source of light arranged to illuminate successive increments of the original in said image plane, said source being located substantially centrally of said path so that the intensity of light issuing from said source varies in a direction transversely of said path; a diaphragm extending across the beam of light reflected by successive increments of the original in said plane, said diaphragm having a light-transmitting slit extending transversely of said beam; an optical system located in the beam of reflected light which has passed through said slit to image successive increments of the original into a second plane, the effective aperture of said optical system varying transversely of said path and the width of said slit also varying transversely of said path as a function of variation of said effective aperture and as a function of said variation in the intensity of light issuing from said source; means for shielding said optical system from light which issues from said source; and means for transporting a photosensitive material in said second plane so that successive increments of the original in said image plane are imaged onto successive increments of photosensitive material in said second plane.

2. A combination as defined in claim 1, further comprising adjusting means actuatable to move said light source transversely of said predetermined path.

3. A combination as defined in claim 1, further comprising adjusting means actuatable to move said light source toward and away from said predetermined path.

4. A combination as defined in claim 1 wherein said light source comprises a single incandescent lamp.

5. A combination as defined in claim 4, wherein said light source is laterally adjacent to the optical axis of said system.

6. A combination as defined in claim 1, wherein the width of said slit decreases from both ends toward the center thereof.

7. A combination as defined in claim 1, further comprising means for reflecting some light issuing from said source onto successive increments of the original in said image plane.

* * * * *